US012654552B2

(12) United States Patent
Buergstein

(10) Patent No.: US 12,654,552 B2
(45) Date of Patent: Jun. 16, 2026

(54) METHOD FOR CONTENT-BASED ADJUSTMENT OF THE VISIBILITY OF CONTENT ON A DISPLAY UNIT

(71) Applicant: Dr. Ing. h.c. F. Porsche Aktiengesellschaft, Stuttgart (DE)

(72) Inventor: Thomas Buergstein, Remseck (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 321 days.

(21) Appl. No.: 18/203,099

(22) Filed: May 30, 2023

(65) Prior Publication Data

US 2023/0382225 A1 Nov. 30, 2023

(30) Foreign Application Priority Data

May 31, 2022 (DE) ..................... 10 2022 113 679.5

(51) Int. Cl.
*B60K 35/00* (2024.01)
*B60K 35/21* (2024.01)
*B60K 35/29* (2024.01)
*B60K 35/81* (2024.01)
B60K 35/40 (2024.01)

(52) U.S. Cl.
CPC .............. *B60K 35/29* (2024.01); *B60K 35/21* (2024.01); *B60K 35/81* (2024.01); *B60K 35/415* (2024.01); *B60K 2360/18* (2024.01); *B60K 2360/349* (2024.01)

(58) Field of Classification Search
CPC ...... B60K 35/00; B60K 35/29; B60K 35/415; B60K 2360/18; B60K 2360/349; B60K 35/21; B60K 35/81; G06F 3/1407
See application file for complete search history.

(56) References Cited

U.S. PATENT DOCUMENTS

| | | | |
|---|---|---|---|
| 10,768,355 B2 | 9/2020 | Klippstein et al. | |
| 11,378,831 B2 | 7/2022 | Heber et al. | |
| 2014/0285531 A1* | 9/2014 | Dasher ...................... | G09G 5/10 |
| | | | 345/690 |
| 2017/0116425 A1 | 4/2017 | Chang | |
| 2018/0082068 A1 | 3/2018 | Lancioni et al. | |
| 2018/0114503 A1* | 4/2018 | Beckmann .......... | G01C 21/367 |

(Continued)

FOREIGN PATENT DOCUMENTS

| | | | |
|---|---|---|---|
| DE | 102020004326 | 9/2021 | |
| JP | 2021138342 | 9/2021 | |
| WO | WO-2006061971 A1 * | 6/2006 | ............. B60K 35/00 |

OTHER PUBLICATIONS

English translation of WO-2006061971.*
German Search Report dated Feb. 6, 2023.

*Primary Examiner* — Erin M Piateski
*Assistant Examiner* — Hajar Hassaniardekani
(74) *Attorney, Agent, or Firm* — LEYDIG, VOIT & MAYER, LTD.

(57) ABSTRACT
A method is provided for content-based adjustment of visibility of content on a display unit. The method includes subdividing content to be displayed on a display unit into a number of regions; evaluating the content in at least one region with respect to its distraction effect; adjusting the display view in the at least one region on the basis of the evaluation carried out. Furthermore, a display unit configured according to the method is provided.

4 Claims, 1 Drawing Sheet

(56)     References Cited

U.S. PATENT DOCUMENTS

2019/0180664 A1      6/2019  Sun et al.
2020/0241824 A1 *   7/2020  Lee ......................... G06F 3/013
2022/0375386 A1     11/2022  Weber et al.
2025/0135886 A1 *   5/2025  Müller ...................... G06F 3/14

* cited by examiner

SUBDIVIDE DISPLAY CONTENT INTO REGIONS

EVALUATE CONTENT IN EACH REGION WITH RESPECT TO DISTRACTION EFFECT

ADJUST THE DISPLAY IN EACH REGION BASED ON EVALUATED CONTENT

40

DISPLAY          44

42          CONTROL DEVICE

46

METHOD FOR CONTENT-BASED ADJUSTMENT OF THE VISIBILITY OF CONTENT ON A DISPLAY UNIT

CROSS REFERENCE TO RELATED APPLICATION

This application claims priority on German Patent Application No 10 2022 113 679.5 filed May 31, 2022, the entire disclosure of which is incorporated herein by reference.

BACKGROUND

Field of the Invention. The invention relates to a method for adjusting visibility of a display unit in a vehicle. The method can be used to operate a passenger display in a manner that restricts the visibility of potentially distracting content on the display unit to the driver.

Related Art. The size and presentation quality of display units installed in vehicles are increasing continuously. Display units have controls for operating numerous vehicle functions and present information and multimedia content. However, tasks and attentiveness needed for a passenger differ drastically from those required for the driver. For example, a passenger may utilize display content for entertainment and passing time without risk during a journey. However, this same content can distract the driver and pose a significant safety risk. This is particularly true for non-driving display-based activities, such as viewing moving images (e.g. exciting videos) or communicating via social networks. Such activities attract the driver's attention and increase the risk of accidents.

For the preceding reasons, passenger displays often are equipped with a switchable privacy mode, so that the driver is not distracted by moving image content during travel. Image content can be masked or altered in a variety of ways when a privacy mode is activated so that visibility from the driver's direction of view is impaired. Switching can be achieved by asymmetrical optical effects that can be brought about by liquid crystals or light guide prisms. The importance of this issue for driving safety is underscored by the fact that the U.S. National Highway Traffic Safety Administration (NHTSA) has clear guidelines for dealing with information, communication, and entertainment facilities provided in the vehicle interior to reduce their potential for distraction in road traffic.

Privacy solutions used today can only insufficiently shade the light. However, the driver often can continue to see the display content on the passenger display (or on the region of the display on the passenger side) in a dark environment with little reflective light. Such inadequately implemented privacy solutions violate the NHTSA guidelines, pose a general risk to road safety and make certification of a vehicle in the United States significantly more difficult. Additionally, a passenger display that is darkened sufficiently to prevent viewing by the driver also provides a poor darkened image for the passenger.

JP2021138342A discloses a vehicular instrument panel extending in the vehicle transverse direction of the motor vehicle. The instrument panel is subdivided into a driver portion and a passenger portion. A brightness reduction portion is arranged on the image display surface of the passenger display panel and blocks or reduces the brightness of a portion or the light from the image light of the passenger's image directed at the driver's seat.

U.S. Pat. No. 11,378,831 discloses a screen for a motor vehicle. The screen has a first operating mode for restricted viewing and a second operating mode for non-restricted viewing. The image of the screen is not intended to visible to the driver in the first operating mode and is visible to the driver in the second operating mode.

DE 10 2020 004 326 B3 discloses a passenger display with a switchable vision-protection device, which, when activated, ensures that display content shown on the passenger display is not visible from the driver's seat region. The shading apparatus has a lighting means directed towards the passenger display and controlled by a control unit that illuminates the passenger display externally to prevent moving fragments that continue to be detected by the driver's seat despite a visual protection switched to shading.

An object of the invention is to provide a method by which potentially distracting content shown on a passenger display of a vehicle can be rendered poorly visible or even undetectable to the driver.

SUMMARY OF THE INVENTION

The invention locally adjusts the display view in selected regions to specifically worsen or disrupt the visibility of content that is potentially distracting to a driver of a vehicle (e.g. exciting moving images) based on an evaluation of the content in the regions. The method can be used to provide a privacy mode or can additionally be carried out on the display unit in an already enabled privacy mode that is based on the know methods described above.

According to the invention, the content of the display unit is subdivided into regions that receive an evaluation of whether the content presented therein is distracting (e.g. video) or non-distracting (e.g. static displays). Based on this rating, the display view is adjusted in regions deemed distracting, for example in an enabled privacy mode, to limit visibility to the driver.

One application scenario is a cabin of a motor vehicle. A passenger display is arranged in the region of a passenger in such a way that image content predetermined to be distracting for the driver is to be invisible or as poorly visible as possible to the driver to prevent the driver from being distracted.

DETAILED DESCRIPTION

It will be appreciated by those skilled in the art that the block diagrams presented herein represent conceptual views of illustrative circuitry, hardware and software embodying the principles of the disclosure. Similarly, any functions or methods implied by these block diagrams may be represented in computer readable media and so executed by a computer or processor, whether or not such computer or processor is explicitly shown.

Figure 1:
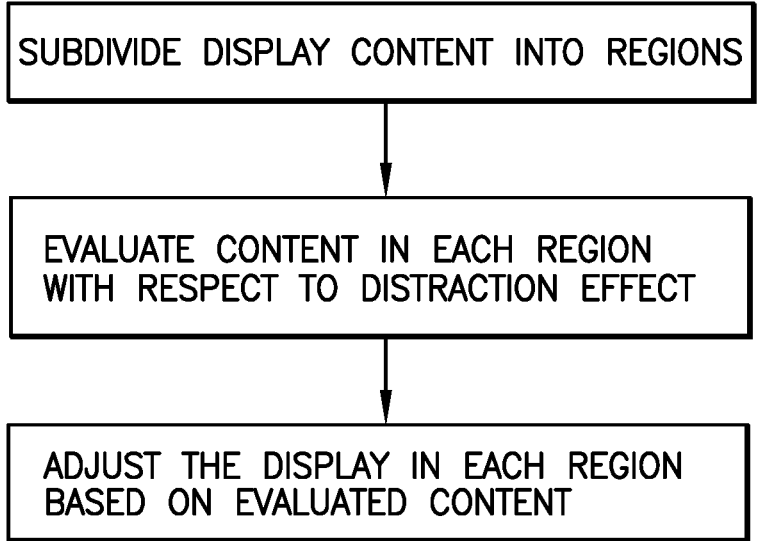
FIG. 1 is a flow chart illustrating steps of a method in one embodiment of the invention.

A method for content-based adjustment of a visibility of content on a display unit is illustrated in FIG. 1 and comprises a first step 10 of subdividing content to be displayed on the display unit into regions. Regions formed in the subdividing step can be of different sizes. Each region can have a homogeneous type of content, such as text, static images, moving images, buttons, etc.

The method of FIG. 1 includes a further step 20 of evaluating the content in the subdivided region with respect to its distraction effect. The evaluation can be based on the potential distraction effect, which is determined or calculated by means of predetermined rules that can be stored in a memory of the display. For example, the distraction effect of a region can be determined based on at least one parameter or any desired combination of parameters. The parameters can comprise: a brightness contrast, a variety of colors, a size, a type of acoustic background, and/or a type of content shown (static image or moving images, e.g. a movie). For example, evaluating each of the image regions can include associating each image region with a distraction index depending on the content presented therein. The distraction index can be done in accordance with legal requirements.

The method of FIG. 1 proceeds with a step 30 of adjusting the display view in at least one of the regions based on the results of the evaluating step 20. In particular, regions with a high (potential) distraction effect can be adjusted in terms of their view. For example, such regions can have a distraction index that is above a predetermined distraction threshold. The adjusting of the display view in the corresponding region may include an adjusting that reduces the lateral visibility of the region for the driver of a vehicle. The corresponding image processing operation can be applied selectively in at least one relevant region.

Application of the method on a display arranged on the front passenger side in a vehicle improves the privacy function vis-à-vis the driver and at the same time improves the image impression for the front passenger.

In some embodiments, the step 10 of subdividing the content to be displayed on the display unit into a number of regions may comprise subdividing into contextually and/or graphically contiguous regions. Contextually and/or graphically contiguous regions can correspond to functionally or visually contiguous regions, e.g. adjacent control elements (e.g. buttons, knobs, sliders), contiguous texts, video renderings, etc.

The step 10 of subdividing the content to be displayed on the display unit into a number of regions can comprise subdividing into regions having static content and regions having moving content.

Some embodiments the evaluating step 20 may include evaluating regions with moving content as needing adjustment in the adjusting step 30 with respect to the displayed view. For example, video renderings can be considered particularly distracting. Thus, regions with video content can be adjusted in the adjusting step 30 in terms of their view in the context of the method described herein.

According to further embodiments of the method, the adjusting in step 30 of the display view in at least one region can be carried out on the basis of a size of the region. This approach is based on the assumption that, especially in a moving form, larger contiguous content can attract human attention more than small contiguous content.

According to further embodiments, the adjusting in step 30 of the display view in the at least one region can comprise the reduction of the brightness of the region. In this embodiment, for example, local dimming can be applied globally in the area of the relevant region by a corresponding brightness-reducing actuation of lighting elements (e.g. LEDs) or groups thereof. In other words, local dimming in the sense of this description means the reduction of the brightness in the entire relevant region and relates to both black values and all other color values. Local dimming can be achieved by applying a corresponding matrix to the actuation field of the display, so that a separate illumination can be carried out in two dimensions, in particular in case of FALD displays (displays with Full Array Local Dimming). However, the still quite common edge lighting (displays with edge LED) can be used in displays for regulating the brightness of the individual regions. Subpixel-based local dimming can be used and is available in modern OLED or micro-LED screens.

Local dimming enables a surface and content-related illumination to be realized by applying an evaluation to the brightness that is natively present according to the image information, i.e. by reducing it within the respective region. Thus, the driver in a vehicle can see image content that is non-critical with respect to a potential distraction, while distracting content is poorly visible to or even remains hidden from the driver. By contrast to the typical local dimming, which is applied globally to displays, this measure is used locally in the course of the method described here and also globally within the at least one relevant region, even if the region contains non-black surfaces that do not experience local dimming on conventional telescreens with local dimming. On the other hand, the trigger for applying the local dimming is a content classified as distracting in one region and not the aim of achieving a black as color-fast as possible (i.e. no light).

In the context of the method described herein, only distracting image content on the display unit is deliberately adjusted in step 30 with respect to its presentation, i.e. reduced in terms of brightness. Thus, the passenger can view non-distracting content (e.g. icons on the side or additional information not covered by the NHTSA guideline) in the full picture quality of the display. At the same time, the driver can continue to see portions of the display without sacrificing visibility, even though they would be "locked" in case of a conventional and non-selective privacy function, i.e. pertaining overall for the entire display, and thus would be hardly visible or not visible. In addition, the advantage is that, for example, a lighter region showing content that is not classified as distracting can blend with a darker region containing content that is classified as distracting, so that the distracting content is (even) more difficult to see.

According to further embodiments, adjusting in step 30 of the display view in the at least one region can comprise reducing the contrast of the region. This measure can be taken in addition to or as an alternative to previous measures. The reduction in contrast can be achieved in a region with distracting content by lighting the dark regions more strongly therein. Because the indicated contrast is related to visibility and typically decreases with reduced contrast, an undesirable distraction of the driver can be reduced further. Of course, as already noted, a local dimming can additionally be used, in which a brightness reduction is applied globally within the relevant region.

According to further embodiments of the method, the adjusting in step 30 of the display view in the at least one region can be carried out on the basis of a position of the region on the display unit. For example, the closer the relevant region is to the driver of the vehicle, i.e. generally speaking the closer the relevant region is to the left edge (in case of right hand traffic) of the display, the more strongly the display can be adjusted.

The method described here can be used for advertisements that do not support a privacy functionality. Again, in this case, the driver's view of the image content can be more or less impaired by the adjustment of the display view in the relevant regions. However, in such a case, the passenger would be affected to the same extent.

Figure 2:
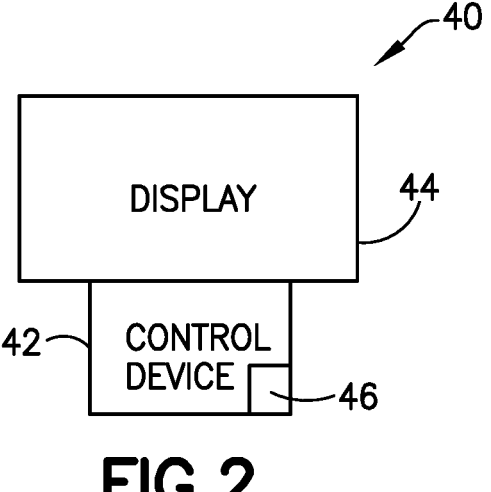
FIG. 2 schematically illustrates a display device according to an embodiment of the invention.

The invention also relates to a display unit identified generally by the numeral 40 in FIG. 2 for presenting content in a vehicle. The elements shown in FIG. 2 and described elsewhere in this disclosure may be implemented in various forms of hardware, software or combinations thereof. Preferably, these elements are implemented in a combination of hardware and software on one or more appropriately programmed general-purpose devices that may include a processor, memory and input/output interfaces. The term "including" as used herein and implied by FIG. 2 is defined to mean directly connected to or indirectly connected through one or more intermediate components. Such intermediate components may include both hardware and software-based components. The display unit 40 is equipped with a control device 42 for controlling a display 44. The control device 42 includes a memory 46 that stores parameters that can comprise a brightness contrast, a variety of colors, a size, a type of acoustic background, and/or a type of content shown (static image or moving images, e.g. a movie). For example, evaluating each of the image regions can include associating each image region with a distraction index stored in the memory depending on the content presented therein. The display unit 40 comprises a function module configured to carry out the method described herein.

The invention claimed is:

1. A method for content-based adjustment of a visibility of a content of a display unit that is disposed on a front passenger side of a passenger cabin of a motor vehicle, the method comprising:

subdividing content to be displayed on a single screen of the display unit into a number of regions;

evaluating the content in each of the regions with respect to predetermined distraction indices that are based upon: a presence or absence of moving images in each of the respective regions, brightness of the content in each of the respective regions, a proximity of each of the regions to a driver side of the passenger cabin, and a size of the region; and adjusting the visibility in an individual region of the regions of the single screen of the display unit based on the evaluating of the content carried out in each of the regions, the adjusting including at least one of: reducing lateral visibility of the individual region from the driver side of the passenger compartment; reducing brightness of at least part of the individual region; and reducing contrast between regions that exceed a predetermined threshold distraction index threshold of one or more of the evaluated predetermined distraction indices and regions that do not exceed the predetermined distraction index threshold of the one or more predetermined distraction indices.

2. The method of claim 1, wherein the subdividing of the content to be displayed on the display unit into the number of regions comprises subdividing into contextually and/or graphically contiguous regions.

3. The method of claim 1, wherein any one of the regions of the display unit that is evaluated to have moving images is deemed as requiring adjustment with respect to that region of the display unit.

4. A display unit for presenting content in a vehicle, comprising a control device for controlling the display, the control device comprising a function module configured to carry out the method of claim 1 for content-based adjustment of a visibility of content on a display unit.

* * * * *